July 3, 1951 A. H. DICKINSON 2,558,936

ELECTRONIC COUNTER

Filed Nov. 21, 1947 2 Sheets-Sheet 1

INVENTOR
ARTHUR H. DICKINSON
BY John R. Shipman
ATTORNEY

July 3, 1951 A. H. DICKINSON 2,558,936
ELECTRONIC COUNTER
Filed Nov. 21, 1947 2 Sheets-Sheet 2

Fig. 2.

Trigger Circuits

| Input Impulse | I | | II | | III | | IV | |
|---|---|---|---|---|---|---|---|---|
| | V1 | V2 | V3 | V4 | V5 | V6 | V7 | V8 |
| 0 | X | 0 | X | 0 | X | 0 | X | 0 |
| 1 | 0 | X | X | 0 | X | 0 | X | 0 |
| 2 | X | 0 | 0 | X | X | 0 | X | 0 |
| 3 | 0 | X | 0 | X | X | 0 | X | 0 |
| 4 | X | 0 | X | 0 | 0 | X | X | 0 |
| 5 | X | 0 | X | 0 | X | 0 | 0 | X |
| 6 | 0 | X | X | 0 | X | 0 | 0 | X |
| 7 | X | 0 | 0 | X | X | 0 | 0 | X |
| 8 | 0 | X | 0 | X | X | 0 | 0 | X |
| 9 | X | 0 | X | 0 | 0 | X | 0 | X |
| 10 | X | 0 | X | 0 | X | 0 | X | 0 |

Note:-
X = Conductive
0 = Non-Conductive

INVENTOR
ARTHUR H. DICKINSON
BY John R. Shipman
ATTORNEY

UNITED STATES PATENT OFFICE 2,558,936

ELECTRONIC COUNTER

Arthur H. Dickinson, Greenwich, Conn., assignor to International Business Machines Corporation, New York, N. Y., a corporation of New York Application November 21, 1947, Serial No. 787,377

6 Claims. (Cl. 250—27)

This invention relates to an electronic counting circuit and is particularly directed to a counting circuit of the series chain type for counting a succession of discrete voltage impulses.

In my co-pending application, Serial No. 787,663, filed on November 24, 1947, now Patent No. 2,521,350, dated September 5, 1950, is described an electronic counter of the series chain type arranged for counting in either the quinary or the bi-quinary system. This counter incorporates a plurality of electronic trigger circuits, each having two different stable conditions which it may assume alternately. Each trigger circuit may be changed or switched from either condition of stability to the other condition upon proper application thereto of a voltage impulse of a predetermined character.

In the counter of the aforesaid co-pending application, four trigger circuits are connected in a series chain so that upon two changes of the condition of stability of any particular trigger circuit a single output voltage impulse is supplied therefrom to the next succeeding trigger circuit in the chain. This output impulse is effective to switch the next succeeding trigger circuit from either stable condition unless that succeeding trigger circuit is the third trigger circuit in the chain, in which case the output impulse is effective to switch it only from a predetermined one of its stable conditions.

Input voltage impulses to be counted are supplied, in my copending application, to the first trigger circuit and to the third trigger circuit in the chain. A control system is interposed between the source of input impulses and the first trigger circuit to determine which of the input impulses is to be actually applied to the first trigger circuit. The connections for supplying input impulses to the third trigger circuit are such that the third trigger circuit will be switched by an input impulse only when the third trigger circuit is in the stable condition opposite the aforesaid one stable condition at the time such input impulse is received. The control system is then connected to be responsive to the condition of the third trigger circuit to prevent input impulses from being applied to the first trigger circuit when the third trigger circuit is in said opposite stable condition.

The counter of my co-pending application is thus arranged to count the first four input impulses in a binary fashion. However, the fifth input impulse causes the first three trigger circuits to be returned to their initial or zero conditions of stability, while the fourth trigger circuit is switched for the first time. In other words, the first three trigger circuits operate sequentially in a predetermined pattern with the pattern being completed by the first five input impulses, thereby counting in the quinary system. The pattern is then repeated with every five succeeding input impulses and the fourth trigger circuit is switched at the end of every two sets of five input impulses, thereby counting in the bi-quinary system.

The counter of my co-pending application as described operates quite satisfactorily and at a very high speed. However, in addition to the trigger circuits, each of which includes a pair of electronic tubes, there must be provided a control system which may incorporate one or more electronic tubes and their associated circuits. In some operations, the very high speeds available with the counter described in my co-pending application are not necessary or particularly desirable. It follows that for such operations a counter of a somewhat simplified construction would be advantageous.

It is accordingly an object of my invention to provide a new and simplified electronic counter of the series chain type for counting in the quinary system and/or in the bi-quinary system.

Another object is to provide an electronic counter of a simplified construction for counting in the scale of five and/or in the scale of ten.

A further object is to provide a novel electronic counter of a simplified construction employing a plurality of trigger circuits responsive to a series of discrete voltage impulses to operate sequentially in a predetermined pattern with the pattern being completed by the first five impulses supplied thereto and repeated with every five succeeding impulses and in which counter the use of electronic tubes, other than those in the trigger circuits, is avoided.

Still another object is to provide a new and simplified electronic counter incorporating a plurality of trigger circuits arranged to complete a predetermined pattern of sequential operations with the first five voltage impulses counted and to repeat the pattern with every five succeeding impulses and also incorporating an additional trigger circuit responsive to operation of the other trigger circuits to provide a pattern of sequential operations of all of the trigger circuits which is completed with the first ten impulses counted and repeated with every ten succeeding impulses and in which counter the use of electronic tubes, other than those in the trigger circuit, is avoided.

More specifically, it is an object to provide a novel counter for counting in the quinary and/or bi-quinary system which comprises three trigger circuits connected in a series chain and means for supplying input impulses to both the first and third trigger circuits and in which switching of the first trigger circuit by an input impulse which is effective to switch the third trigger circuit is prevented by a new and simplified arrangement.

An ancillary object is to provide a new and improved feedback interconnection between two electronic trigger circuits.

According to my invention, an electronic counter is provided incorporating the four trigger circuits. Input voltage impulses to be counted are to be applied to the first trigger circuit and to the third trigger circuit, the application of the input impulses to the third trigger circuit being such as to effect switching of the third trigger circuit only when that circuit is in a predetermined stable condition. A capacitive feed-back circuit interconnects the third trigger circuit and the first trigger circuit to prevent the latter from being switched by an input impulse supplied while the third trigger circuit is in said predetermined stable condition.

To insure accurate operation of the counter at its maximum speed, the feed-back from the third trigger circuit may be accomplished through a pair of capacitors through which are transmitted feed-back voltage impulses of opposite polarities. The capacitors are coupled to the control grids of opposite tubes of the first trigger circuit to counteract the effect of an input impulse applied to the first trigger circuit.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a table in which are tabulated the conditions of the various tubes in the circuit of Fig. 1 during a counting operation.

Figure 1:
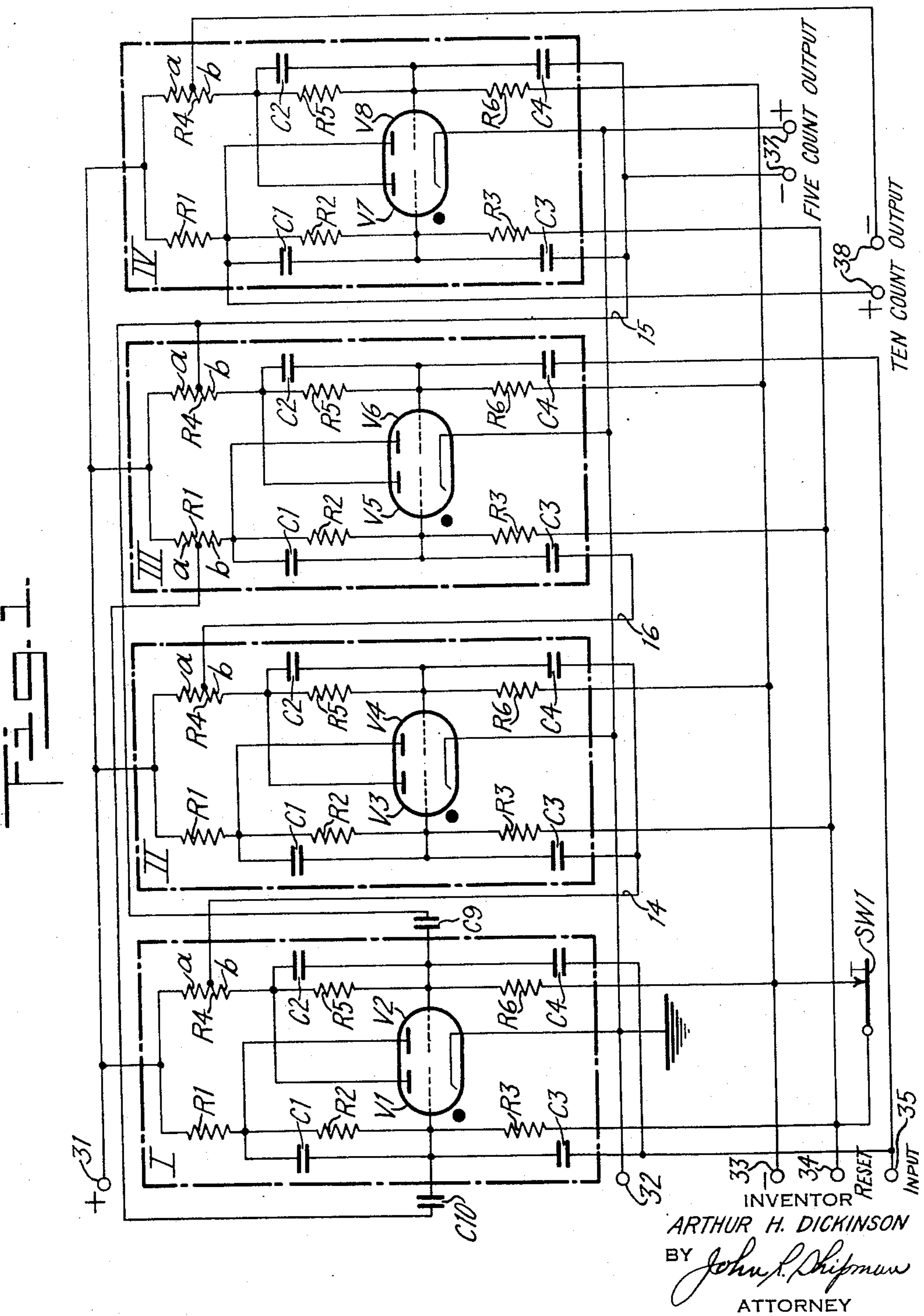
Fig. 1 is a circuit diagram illustrating one embodiment of my invention as applied to a counter for counting in the scale of five and/or in the scale of ten.

Referring to the drawings, in Fig. 1 the counter is shown as comprising four identical electronic trigger circuits, I, II, III and IV, set off, for convenience, in separate broken line boxes. Each of the trigger circuits I, II, III and IV, as illustrated, includes a twin vacuum tube comprising in effect two tubes within a single envelope, each having an anode, a cathode and a control grid. It will be understood, of course, that each twin tube may be replaced by two separate tubes if desired. Filaments and the energizing circuits therefor which are customary with such tubes have been omitted from the diagram to afford greater clarity.

Identical elements, except the tubes, in the four trigger circuits I, II, III and IV have the same reference characters applied thereto. For convenience in explaining the operation the left-hand halves of the tubes of the trigger circuits I, II, III and IV are referred to as V1, V3, V5 and V7 respectively and the right-hand halves as V2, V4, V6 and V8 respectively. As the four trigger circuits are identical, only the first trigger circuit I will be described in detail.

The anode of tube V1 of the first trigger circuit I is connected to the anode of tube V2 through a pair of series connected resistors R4 and R1. The junction point of these resistors R1 and R4 is connected to a common positive voltage supply terminal 31. The common cathode of tubes V1 and V2 is connected to the grounded voltage terminal 32. The anode of tube V2 is coupled to the control grid of tube V1 through a resistor R2 in parallel with a capacitor C1. Similarly, the anode of tube V1 is coupled to the control grid of tube V2 through a resistor R5 in aprallel with a capacitor C2. The control grids of tubes V1 and V2 are additionally connected through resistors R3 and R6 respectively to a reset line 34 and a negative voltage terminal 33 respectively. A normally closed reset switch SW1 interconnects the reset line 34 and the negative terminal 33. A pair of capacitors C3 and C4 are connected in series in the order named between the control grid of tube V1 and the control grid of tube V2. Voltage impulses for switching the first trigger circuit are then to be applied to the junction point between capacitors C3 and C4 and through such capacitors to the control grids of tubes V1 and V2.

The operation of a trigger circuit as described is well known. An understanding of this operation may be facilitated if it is assumed that at some instant the grid of tube V1 is at substantially the same voltage as its cathode. Tube V1 is then highly conductive and, with the resistance of the resistor R4 properly chosen, has a very low impedance compared with that of resistor R4. Current through the tube V1 is then very large and the anode voltage is not much greater than that of terminal 32. With the resistance of resistors R5 and R6 properly chosen, the voltage drop across the resistor R5 between the anode of tube V1 and the grid of tube V2 is sufficient to maintain the grid voltage of tube V2 below its cut-off value. Hence, the tube V2 is non-conductive and its anode voltage is so high that the voltage drop across the resistor R2 is not sufficient to force the grid voltage of tube V1 below the voltage of terminals 32 so that tube V1 remains highly conductive. With tube V1 highly conductive and tube V2 non-conductive, the trigger circuit is in one of its two stable conditions.

To change or switch the tube or circuit to its other stable condition a negative operating impulse may be applied through the capacitors C3 and C4 to the grids of tubes V1 and V2. Since tube V2 is already non-conductive, as set forth above, this impulse does not produce any direct effect on that tube. However, the application of the negative impulse to the grid of tube V1 causes the voltage of the grid to become more negative, so that current flow through resistor R4 and the tube V1 to terminal 12 is reduced. This causes the voltage of the anode end of resistor R4 to rise very rapidly so that a positive voltage impulse is applied through the capacitor C2 and renders the grid of tube V2 more positive. Thus the voltage of the grid of tube V2 rises quickly to a value above the cut-off value and current flow through V2 and its plate resistor R1 starts substantially instantaneously.

When the tube V2 thus becomes conductive, the voltage at the anode end of resistor R1 drops rapidly to cause a negative voltage impulse to be fed through capacitor C1 to the grid of tube V1, augmenting the negative impulse received through capacitor C3 so that if the grid voltage of tube V1 has not already been dropped below the cut-off value, this lowered anode voltage of tube V2 results in a further decrease in the grid voltage of tube V1 and a corresponding increase in the anode voltage of tube V1 to increase the grid voltage of tube V2. This action continues until tube V1 is non-conductive and tube V2 is highly conductive. The lowered anode voltage of tube V2 with the voltage drop across resistor R2 tends to maintain tube V1 non-conductive thereafter. This second condition in which the tube V1 is non-conductive and the tube V2 is highly conductive is the second stable condition of the trigger circuit.

The trigger circuit is maintained in the second stable condition until another or second negative operating impulse is applied to the grids of tubes V1 and V2. This second negative impulse drops the voltage of the grid of the conductive tube V2, producing an increase in the anode voltage thereof to transmit a positive impulse to the grid of the non-conductive tube V1. Tube V1 thereupon begins to conduct current and the resulting drop in its anode voltage is applied to the grid of tube V2 to drop the voltage thereof below the cut-off value. Tube V2 then becomes non-conductive and tube V1 conductive, so that the trigger circuit is again in its first stable condition.

It will be understood that when tube V2 is conductive and tube V1 is non-conductive, every point on the right-hand resistor network comprising resistors R4, R5 and R6 is at the higher of two voltages and every point on the left-hand resistor network comprising resistors R1, R2 and R3 is at the lower of two voltages. In the other stable condition, when tube V1 is conductive and tube V2 is non-conductive, every point on the resistor network R1, R2 and R3 is at the higher of two voltages and every point on the resistor network R4, R5 and R6 is at the lower of two voltages. This condition enables an output voltage impulse to be taken from the trigger circuit through a lead wire 14 connected to an intermediate point on resistor R4. Thus when tube V2 is conductive, this intermediate point is at the higher of two voltages, but when the trigger circuit is thereafter switched and tube V1 becomes conductive, the intermediate point on resistor R4 is at the lower of the two voltages and a negative voltage impulse is supplied through the output lead wire 14. From the foregoing, it is apparent that such a negative voltage impulse is supplied through output lead wire 14 once for every two negative impulses applied to the grids of tubes V1 and V2.

The output lead wire 14 from the first trigger circuit I is connected to the grids of tubes V3 and V4 of the second trigger circuit II through the associated capacitors C3 and C4. Similarly, the output lead wire 15 of the third trigger circuit III is connected to the grids of tubes V7 and V8 of the fourth trigger circuit IV. It is to be particularly noted, however, that the output lead wire 16 of trigger circuit II is connected to the grid of tube V5 only of the third trigger circuit III, the grid of tube V6 being connected through capacitor C4 to an input terminal 35.

It should also be pointed out at this time that while both negative and positive voltage impulses are supplied at different times through the output lead wires 14, 16 and 15 of trigger circuits I, II and III respectively, it is well known that because of the grid current in tubes V2, V4 and V6 the positive impulse does not have as steep a wave front nor as great a peak magnitude as the negative impulse. Consequently, the values of the resistors and capacitors in the grid circuits of the tubes of the trigger circuits may be chosen so that only the negative impulses are effective to switch the trigger circuit so supplied.

To provide a feed-back coupling from the third trigger circuit III to the first trigger circuit I, a capacitor C9 is connected from an intermediate point on the resistor R4 in the third trigger circuit to the control grid of tube V2 in the first trigger circuit, and a capacitor C10 is connected from an intermediate point on resistor R1 in the third trigger circuit to the control grid of tube V1 in the first trigger circuit. It is then evident that as the third trigger circuit III is switched from one stable condition, in which tube V5 is conductive, to its other stable condition, in which tube V6 is conductive, a positive voltage pulse is transferred through capacitor C10 to the control grid of tube V1 in the first trigger circuit I, while a negative pulse is simultaneously transmitted through capacitor C9 to the control grid of tube V2. When the third trigger circuit III is switched from the stable condition, in which tube V6 is conductive, to the stable condition in which tube V5 is conductive, a negative pulse is transmitted through capacitor C10, while a positive pulse is simultaneously transmitted through capacitor C9.

A pair of five count output terminals 37 are provided in the counter, one being connected to the grounded terminal 32 and the other to the output lead 15 of the third trigger circuit III. A pair of ten count output terminals 38 are also provided in the counter, one being connected to the anode of tube V8 in the fourth trigger circuit IV and the other to an intermediate point on the resistor R4 in the fourth trigger circuit IV. As explained hereinafter, a voltage pulse of the polarity indicated in Fig. 1 appears across the five count terminals 37, once for each five input impulses counted, and a voltage impulse of the polarity indicated in the drawing appears across the ten count terminals 38 once for each ten input impulses counted.

The operation of the counter may be better understood by reference to the table of Fig. 2 in connection with Fig. 1. Before operation of the counter is initiated, the trigger circuits must be placed in an initial or zero condition. To accomplish this, the hand switch SW1 is momentarily opened. As previously indicated, the hand switch SW1 is normally closed to interconnect the negative voltage terminal 33, to which the resistors R6 of all of the trigger circuits are connected, and the common reset line 34 to which the resistors R3 of all of the trigger circuits are connected. When switch SW1 is momentarily opened, all points on the resistor network comprising resistors R1, R2 and R3 of each trigger circuit tend to rise in voltage to the voltage of the positive terminal 31 to which resistors R1 are connected. Consequently, the point intermediate resistors R2 and R3 in each trigger circuit, to which the grids of tubes V1, V3, V5 and V7 respectively, are connected, rises in voltage to slightly above zero, a further rise being prevented by the flow of grid current for the corresponding tube. However, this value of grid voltage is well above the cut-off value of the corresponding tube and it becomes conductive. Of course, if any one of the tubes V1, V3, V5 and V7 were already conductive when the hand switch SW1 was opened, it would remain in the conductive state. Thus, after the hand switch SW1 is opened, all of the trigger circuits assume that condition of stability in which the tubes V1, V3, V5 and V7 are conductive, as indicated in Fig. 1 by the dot adjacent each of these tubes. Thereafter, switch SW1 is reclosed to apply the normal bias to the grid of tubes V1, V3, V5 and V7 which alone cannot effect a change in the conditions of stability of the trigger circuits.

With the trigger circuits in their zero condition, the first negative input impulse to be counted may be applied to the input terminal 35 from which it is transmitted to the grids of both tubes V1 and V2 of the first trigger circuit I through capacitors C3 and C4 respectively and at the same time is transmitted to the grid of tube V6 in the third trigger circuit III through the corresponding capacitor C4. Since the tube V6 is already non-conductive, the first negative input impulse has no effect upon the third trigger circuit III. However, the first input impulse does effect a switching of the first trigger circuit I, as indicated in the table of Fig. 2, to cause tube V1 to become non-conductive and tube V2 to become conductive.

The second negative input impulse likewise has no direct effect upon the third trigger circuit III but causes the first trigger circuit I to be switched again so that tube V1 becomes conductive and tube V2 becomes non-conductive. As tube V2 becomes non-conductive, a negative impulse is supplied through lead wire 14 to the grids of tubes V3 and V4 of the second trigger circuit II. This switches the second trigger circuit II so that its tube V3 becomes non-conductive and tube V4 becomes conductive.

The third negative input impulse does not affect trigger circuit III but it does cause the first trigger circuit I to be switched, as indicated in the table of Fig. 2, without, however, switching the second trigger circuit II.

The fourth negative input impulse does not directly affect the third trigger circuit III since, as stated above, tube V6 is non-conductive. However, this fourth input impulse switches the first trigger circuit I which thereupon supplies an impulse through lead wire 14 to switch the second trigger circuit II. When the second trigger circuit II is thus switched, its tube V3 becomes conductive and tube V4 becomes non-conductive so that a negative output impulse is supplied through lead wire 16 to the grid of tube V5 in the third trigger circuit III. As a result, tube V5 becomes non-conductive and tube V6 becomes conductive.

When the third trigger circuit III is so switched by the output impulse from the second trigger circuit II, voltage impulses are fed back to the first trigger circuit I through capacitors C9 and C10. These impulses are of a polarity tending to make the grid of tube V1 negative and to make the grid of tube V2 positive and thus tends to switch the first trigger circuit I back to the stable condition existing immediately prior to the application of the fourth input impulse. However, as will be explained hereafter, the arrangement of the intermediate points on resistors R1 and R4 in the third trigger circuit III, to which the capacitors C9 and C10 are connected, is such that the first trigger circuit I is not switched by the feed-back impulses resulting from a switching of the third trigger cricuit III with the fourth input impulse.

The fifth negative input impulse, directly applied, is then effective to render tube V6 non-conductive, thus switching the third trigger circuit III back to its initial or zero condition. When the third trigger circuit III is so switched, a negative voltage impulse is fed back from R4 of circuit III through capacitor C9 to the grid of tube V2, while a positive voltage impulse is simultaneously fed back from resistor R1 of circuit III through capacitor C10 to the grid of tube V1. The magnitude of these impulses, fed back from trigger circuit III through capacitors C9 and C10, is sufficient to insure that the first trigger circuit I is in its same condition prior to and after the application of this fifth negative input impulse.

It will be understood by those skilled in the art that the impulse fed back through capacitor C9 alone may be sufficient to prevent the first trigger circuit I from being switched. However, the use of both feed-back impulses, simultaneously, insures accurate operation, particularly at high speeds.

As previously mentioned, the impulses fed back from the third trigger circuit III through the first trigger circuit I, as a result of switching of the third trigger circuit III with the fourth input impulse, are not effective to switch the first trigger circuit I, while the impulses fed back as a result of switching of the third trigger circuit III with the fifth input impulse are effective to insure that the first trigger circuit I is in its same condition prior to and after the application of the fifth negative input impulse. This action may be accomplished by selecting the intermediate points on resistors R1 and R4 in the third trigger circuit III so that the magnitude of the impulse fed back from resistor R1 is not as great as that fed back from resistor R4. It follows that the negative impulse fed back to tube V1 from resistor R1, as a result of the switching of trigger circuit III with the fourth input impulse, is not as large as the negative impulse fed back to tube V2 from resistor R4, as a result of the switching of trigger circuit III with the fifth input impulse. The difference in magnitude of these two impulses is such that the first trigger circuit I is not switched by the feed-back resulting from the fourth input impulse but the feed-back is sufficient to prevent the first trigger circuit from being switched by the fifth input impulse.

As can be seen from the table of Fig. 2, the fifth input impulse counted returns the first three trigger cricuits to their initial stable conditions existing prior to the first input impulse. The switching of the third trigger circuit III by the fifth input impulse produces an output impulse of the indicated polarity across the five count output terminals 37. Simultaneously, an output impulse is supplied via lead wire 15 to switch the fourth trigger circuit IV.

Trigger circuit IV remains in this new stable condition, as is seen from Fig. 2, until the second such fifth input impulse (i. e., the tenth input impulse counted), whereupon trigger circuit III is again switched to the stable condition in which tube V5 is conductive to provide a second negative impulse over lead wire 15 to switch trigger circuit IV and render its tube V7 conductive. Thus, upon the tenth input impulse, a voltage output impulse of the indicated polarity appears across the ten count output terminals 38.

In a typical counter constructed according to Fig. 1 and operated satisfactorily, the various components were of the following values and types:

| Tubes | Resistors | Capacitors |
|---|---|---|
| V1—V2, V3—V4, V5—V6, V7—V8 = 12SN7 | R1, R4 = .02 meg.<br>R1a (III) = .01 meg.<br>R1b (III) = .01 meg.<br>R4a (I) = .015 meg.<br>R4b (I) = .005 meg.<br>R4a (II, III, IV) = .012 meg.<br>R4b (II, III, IV) = .008 meg.<br>R2, R3, R5, R6 = .15 meg. | C1, C2 = 100 mmfd.<br>C3, C4, C9, C10 = 40 mmfd. |

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A quinary electronic counter comprising three trigger circuits connected in a series chain, each trigger circuit having two conditions of stability to which it may be switched alternately by the proper application thereto of operating voltage impulses and, with each second switching thereof, providing an operating impulse to the next succeeding trigger circuit in the chain, the series chain connection permitting an impulse from the first trigger circuit to switch the second trigger circuit from either stable condition to the other and an impulse from the second trigger circuit to switch the third trigger circuit from only one stable condition; a single supply line adapted to carry input operating impulses and connected directly to the first and third trigger circuits to effect switching of the first trigger circuit from either stable condition normally by each input impulse and to effect switching of the third trigger circuit by an input impulse only from its other stable condition; said third trigger circuit having a point at which an auxiliary impulse appears when said third trigger circuit is switched from said other condition; and a capacitive feed-back coupling connected from said point to said first trigger circuit and effective when the third trigger circuit is switched from its other stable condition to transmit said auxiliary impulse to said first trigger circuit to prevent an input impulse which effects such switching of the third trigger circuit from switching the first trigger circuit.

2. A quinary electronic counter comprising three trigger circuits, each having two conditions of stability to which it may be switched alternately by the application thereto of operating voltage impulses; circuit means connecting said trigger circuits in a series chain whereby the first trigger circuit upon being switched to a particular one of its stable conditions transmits an operating impulse to the second trigger circuit to switch it from either stable condition, and the second trigger circuit upon being switched to a particular one of its stable conditions transmits an operating impulse to the third trigger circuit to switch it only from a first one of its stable conditions; a single supply line adapted to carry input operating impulses and connected directly to the first and third trigger circuits to effect switching of the first trigger circuit from either stable condition normally by each input impulse and to effect switching of the third trigger circuit by an input impulse only from its second stable condition; said third trigger circuit having a point at which an auxiliary impulse appears when said third trigger circuit is switched from said second condition; a capacitive feed-back coupling connected from said point to said first trigger circuit and effective when the third trigger circuit is switched from said second condition to transmit said auxiliary impulse to said first trigger circuit to prevent an input impulse which effects such switching of the third trigger circuit from switching the first trigger circuit; said third trigger circuit having an output terminal at which an output impulse of a predetermined character appears each time the third trigger circuit is switched to a certain one of its stable conditions; and means connected to said trigger circuits whereby each trigger circuit may be made to assume an initial stable condition causing an output impulse at said output terminal for every fifth input impulse.

3. A bi-quinary electronic counter comprising four trigger circuits, each having two conditions of stability to which it may be switched alternately by the application thereto of operating voltage impulses; circuit means connecting said trigger circuits in a series chain whereby each of the first, second, and third trigger circuits in the chain upon being individually switched to a particular one of its stable conditions transmits an operating impulse to the next higher trigger circuit to switch it from either stable condition unless that next higher trigger circuit is the third trigger circuit in which case the transmitted impulse is effective to switch it only from a first of its stable conditions; a single supply line adapted to carry input operating impulses and connected directly to the first and third trigger circuits to effect switching of the first trigger circuit from either stable condition normally by each input impulse and to effect switching of the third trigger circuit by an input impulse only from its second stable condition; said third trigger circuit having a point at which an auxiliary impulse appears when said third trigger circuit is switched from said other condition; a capacitive feed-back coupling connected from said point to said first trigger circuit and effective when the third trigger circuit is switched from said second condition to transmit said auxiliary impulse to said first trigger circuit to prevent an input impulse which effects such switching of the third trigger circuit from switching the first trigger circuit; said fourth trigger circuit having an output terminal at which an output impulse of predetermined character appears each time the fourth trigger circuit is switched to a particular stable condition; and means connected to said trigger circuits whereby each trigger circuit may be made to assume an initial stable condition causing said third trigger circuit to transmit an impulse to said fourth trigger circuit for every fifth input impulse and an output impulse to appear at said output terminal for every tenth input impulse.

4. In an electronic counter, a plurality of trigger circuits connected in a series chain and adapted to be energized from a source of voltage, each trigger circuit having two conditions of stability and including a pair of grid-controlled electronic tubes, one of which is conductive in one condition of stability while the other is conductive in the opposite condition of stability, each trigger circuit being adapted to be switched from either stable condition to the other upon a predetermined change in the grid voltage of at least one of the tubes and also including an impedance network connected to cause the voltage at a first point and at a second point on the network to become more positive and more negative, respectively, as the trigger circuit is switched to one stable condition, and to become more negative and more positive, respectively, as the trigger circuit is switched to the other condition, a first capacitive feed-back circuit connecting said first point on the network of a selected trigger circuit, other than the first trigger circuit in the chain, to the grid of one of said tubes in a lower trigger circuit, and a second capacitive feed-back circuit connecting said second point on the network of said selected trigger circuit to the grid of the other tube in said lower trigger circuit, whereby positive and negative voltage impulses are transmitted simultaneously over opposite ones of said feed-back circuits from said selected trigger circuit to said lower trigger circuit as said selected trigger circuit is switched said first and second points on the network of said selected circuit being selected to provide a greater voltage change at the first point with a switching of said selected trigger circuit than at the second point.

5. An electronic counter comprising a group of at least three trigger circuits adapted to be energized from a source of voltage, each trigger circuit having two conditions of stability and including a pair of grid-controlled electronic tubes, one of which is conductive in one stable condition while the other is conductive in the other stable condition, each trigger circuit being adapted to be switched from either stable condition to the other upon application of a negative voltage operating impulse to the grid of the conductive tube in the trigger circuit, each of the trigger circuits also including an impedance network connected to cause the voltage at certain first points and at certain second points on said network to become more positive and more negative, respectively, as the trigger circuit is switched to said one condition, and to become more negative and more positive, respectively, as the trigger circuit is switched to said other condition; circuit means connecting said trigger circuits in a series chain; a single supply line adapted to carry input operating impulses connected to the grids of both tubes of the first trigger circuit in the chain and to the grid of only said other tube of the third trigger circuit; said circuit means including connections from one of said second points on said network in each trigger circuit, except the highest, to the grids of both tubes of the next succeeding trigger circuit in the chain, unless that next succeeding trigger circuit is said third trigger circuit in which case the connection is from one of said second points to the grid of said one tube, whereby an operating impulse is transmitted from a trigger circuit to the next succeeding trigger circuit each time the former is switched to said one condition; and capacitive feed-back circuits connecting one of said first points on the network of said third trigger circuit to the grid of said other tube of the first trigger circuit and connecting one of said second points on the network of said third trigger circuit to the grid of said one tube of the first trigger circuit and effective to prevent an input impulse which directly effected switching of said third trigger circuit from switching the first trigger circuit.

6. Apparatus according to claim 5 in which the first and second points on the network of the third trigger circuit to which the capacitive feed back circuits are connected are selected to provide a greater voltage change at the first point with a switching of the third trigger circuit than at the second point permitting an input impulse which coincides in time with the switching of the third trigger circuit by an operating impulse transmitted from the second trigger circuit, to switch the first trigger circuit while preventing an input impulse which directly effected switching of the third trigger circuit from switching the first trigger circuit.

ARTHUR H. DICKINSON.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,381,920 | Miller | Aug. 14, 1945 |
| 2,489,303 | Lyons | Nov. 29, 1949 |

OTHER REFERENCES

Electronics, June 1944 "A Four Tube Counter Decade" by Potter, pages 110–113, 358 and 360.

RCA Review, vol. VII; No. 3 Sept. 1946 "Electronic Counters" by Grosdoff, pages 438–447.